(12) United States Patent
Muto et al.

(10) Patent No.: US 8,318,624 B2
(45) Date of Patent: Nov. 27, 2012

(54) DIELECTRIC CERAMIC AND LAMINATED CAPACITOR

(75) Inventors: Kazuo Muto, Izumo (JP); Kohei Shimada, Yasu (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 288 days.

(21) Appl. No.: 12/881,275

(22) Filed: Sep. 14, 2010

(65) Prior Publication Data

US 2011/0085280 A1    Apr. 14, 2011

(30) Foreign Application Priority Data

Oct. 9, 2009  (JP) ................. 2009-234729

(51) Int. Cl.
*C04B 35/468*    (2006.01)

(52) U.S. Cl. ............. 501/139; 501/138; 361/321.4

(58) Field of Classification Search ............. 501/137, 501/138, 139
See application file for complete search history.

(56) References Cited

U.S. PATENT DOCUMENTS

| 7,501,371 B2 * | 3/2009 | Sasabayashi et al. ....... 501/138 |
| 2009/0195960 A1 | 8/2009 | Sato et al. |

FOREIGN PATENT DOCUMENTS

| CN | 101248025 A | 8/2008 |
| JP | 10330160 A | 12/1998 |
| WO | WO-2008105240 A1 | 9/2008 |

\* cited by examiner

*Primary Examiner* — Karl Group
(74) *Attorney, Agent, or Firm* — Dickstein Shapiro LLP

(57) ABSTRACT

A dielectric ceramic containing a $BaTiO_3$ based material as its main constituent, and, as accessory constituents, a rare-earth element R (R is at least one selected from Nd, Eu, Gd, Tb, Dy, Ho, Er, Yb, and Y), M (M is at least one selected from Mg, Mn, Ni, Co, Cu, Al, Mo, W, and V), $SiO_2$, and CaO. Among crystal grains included in this dielectric ceramic, the ratio of the number of crystal grains 11 in which Si is present in solid solution is 5% or more.

15 Claims, 1 Drawing Sheet

DIELECTRIC CERAMIC AND LAMINATED CAPACITOR

BACKGROUND OF THE INVENTION

1. Field of the Invention

The present invention relates to a dielectric ceramic and a laminated ceramic capacitor, and more particularly, relates to the microstructure of a dielectric ceramic which is suitable for use in a thin-layer high-capacity laminated ceramic capacitor, and a laminated ceramic capacitor configured with the use of the dielectric ceramic.

2. Description of the Related Art

As one of the effective measures for satisfying the needs of reduction in size and increase in capacity for laminated ceramic capacitors, the reduction in thickness is conceived for dielectric ceramic layers provided in the laminated ceramic capacitors. Therefore, the dielectric ceramic layers may be made thinner to a thickness, for example, on the order of 1 μm. However, as the dielectric ceramic layers are further reduced in thickness, the electric field applied per dielectric ceramic layer is relatively higher. Therefore, the improvement in reliability in the case of applying a voltage, more specifically, the improvement in lifetime characteristics particularly in a moisture resistance loading test and a high temperature loading test is required for the dielectric ceramic used.

A dielectric ceramic of interest to the present invention is described in, for example, Japanese Patent Application Laid-Open No. 10-330160 (Patent Document 1), which discloses a technique for improving the dielectric breakdown voltage of a dielectric ceramic, and more specifically, discloses the following.

$BaCO_3$ and $TiO_2$ with MnO added thereto are calcined to obtain $Ba(Ti, Mn)O_3$. This calcined $Ba(Ti, Mn)O_3$ with MnO, MgO, $Dy_2O_3$, and a $Li_2O+SiO_2+BaO$ glass component added thereto is calcined to obtain a material for the formation of green sheets, and the green sheets formed from the material are used to form a laminate for a laminated capacitor. The laminate is fired in a reducing atmosphere, and then subjected to an oxidation treatment. This distributes Mn in both a ferroelectric phase section (core) and a paraelectric phase section (shell) of crystal grains in a substantially uniform fashion, thereby increasing the dielectric breakdown voltage.

However, even in the case of using the dielectric ceramic described in Patent Document 1 described above, the further reduction in the thickness of the dielectric ceramic layers leads to insufficient reliability, in particular, insufficient lifetime characteristics in a high temperature loading test and a moisture resistance loading test, and further improvements have been thus desired. It is to be noted that Patent Document 1 fails to disclose the thickness of the dielectric ceramic layers at all.

SUMMARY OF THE INVENTION

Therefore, an object of the present invention is to provide a dielectric ceramic which is able to achieve high reliability even with further reduction in the thickness of a dielectric ceramic layer, and a laminated ceramic capacitor configured with the use of the dielectric ceramic.

In order to solve the technical problems described above, the present invention is first aimed at a dielectric ceramic containing a $BaTiO_3$ based material as its main constituent, and, as accessory constituents, R (R is at least one selected from Nd, Eu, Gd, Tb, Dy, Ho, Er, Yb, and Y), M (M is at least one selected from Mg, Mn, Ni, Co, Cu, Al, Mo, W, and V), and $SiO_2$, wherein among crystal grains included in the dielectric ceramic, the ratio of the number of crystal grains in which Si is present in solid solution is 5% or more.

In the dielectric ceramic according to the present invention, it is preferred that CaO is further added as an accessory constituent.

According to an aspect of the present invention, a laminated ceramic capacitor contains a capacitor main body containing a plurality of dielectric ceramic layers stacked, a plurality of internal electrodes formed along specific interfaces between the dielectric ceramic layers, and a plurality of external electrodes formed in different positions from each other on an outer surface of the capacitor main body and electrically connected to specific one of the internal electrodes.

A laminated ceramic capacitor according to the present invention characteristically has a dielectric ceramic layer composed of the dielectric ceramic according to the present invention.

In accordance with the dielectric ceramic according to the present invention, when crystal grains in which Si is present in solid solution are made present at 5% or more in terms of numbers, the bonding force between crystal grains can be improved, and thus, the characteristics in moisture resistance loading can be improved for the laminated ceramic capacitor configured with the use of this dielectric ceramic.

When the laminate ceramic according to the present invention further contains CaO as an accessory constituent, the ratio of crystal grains in which Si is present in solid solution is more likely to be increased, and the characteristics in high temperature loading can be improved for the laminated ceramic capacitor configured with this use of this dielectric ceramic.

DETAILED DESCRIPTION OF THE INVENTION

Figure 1:
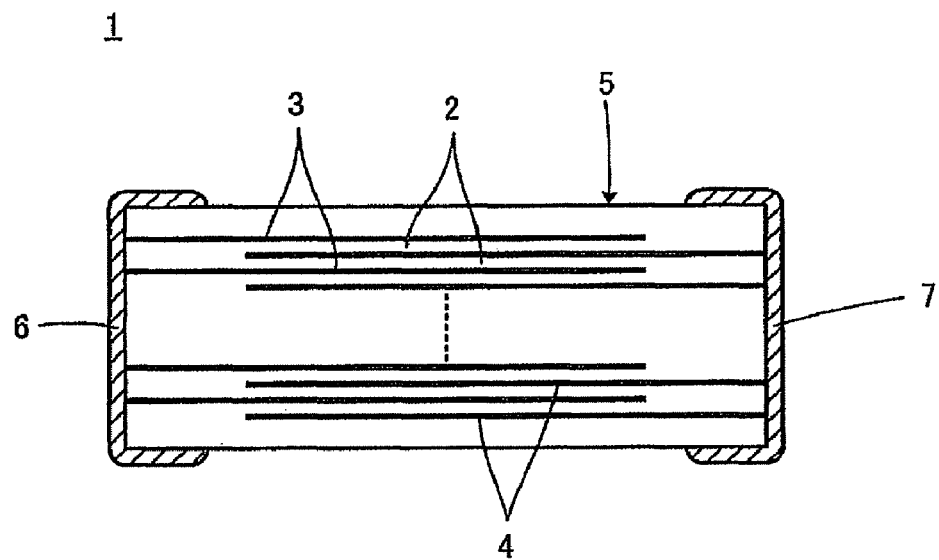
FIG. 1 is a cross-sectional view schematically illustrating a laminated ceramic capacitor 1 configured with the use of a dielectric ceramic according to the present invention.

With reference to FIG. 1, a laminated ceramic capacitor 1 will be first described to which a dielectric ceramic according to the present invention is applied.

The laminated ceramic capacitor 1 includes a capacitor main body 5 configured with the use of a plurality of dielectric ceramic layers 2 stacked and a plurality of internal electrodes 3 and 4 formed along the specific interfaces between the dielectric ceramic layers 2. The internal electrodes 3 and 4 contain, for example, Ni as a main constituent.

First and second external electrodes 6 and 7 are formed in different positions from each other on the outer surface of the capacitor main body 5. The external electrodes 6 and 7 contain, for example, Ag or Cu as its main constituent. The laminated ceramic capacitor 1 shown in FIG. 1 has the first and second external electrodes 6 and 7 formed on the respective end surfaces of the capacitor main body 5 opposed to each other. The internal electrodes 3 and 4 include a plurality of first internal electrodes 3 electrically connected to the first external electrode 6 and a plurality of second internal electrodes 4 electrically connected to the second external electrode 7, and these first and second internal electrodes 3 and 4 are alternately arranged with respect to the staking direction.

It is to be noted that the laminated ceramic capacitor 1 may be a two-terminal capacitor including two external electrodes 6 and 7, or may be a multi-terminal capacitor including a larger number of external electrodes.

In this laminated ceramic capacitor 1, the dielectric ceramic layers 2 are composed of a dielectric ceramic containing a $BaTiO_3$ based material as its main constituent, and, as accessory constituents, a rare-earth element R(R is at least one selected from Nd, Eu, Gd, Tb, Dy, Ho, Er, Yb, and Y), M (M is at least one selected from Mg, Mn, Ni, Co, Cu, Al, Mo, W, and V), and $SiO_2$.

It is to be noted that the $BaTiO_3$ based main constituent may have Ba partially substituted with at least one of Ca and Sr, and Ti partially substituted with at least one of Zr and Hf.

Figure 2:
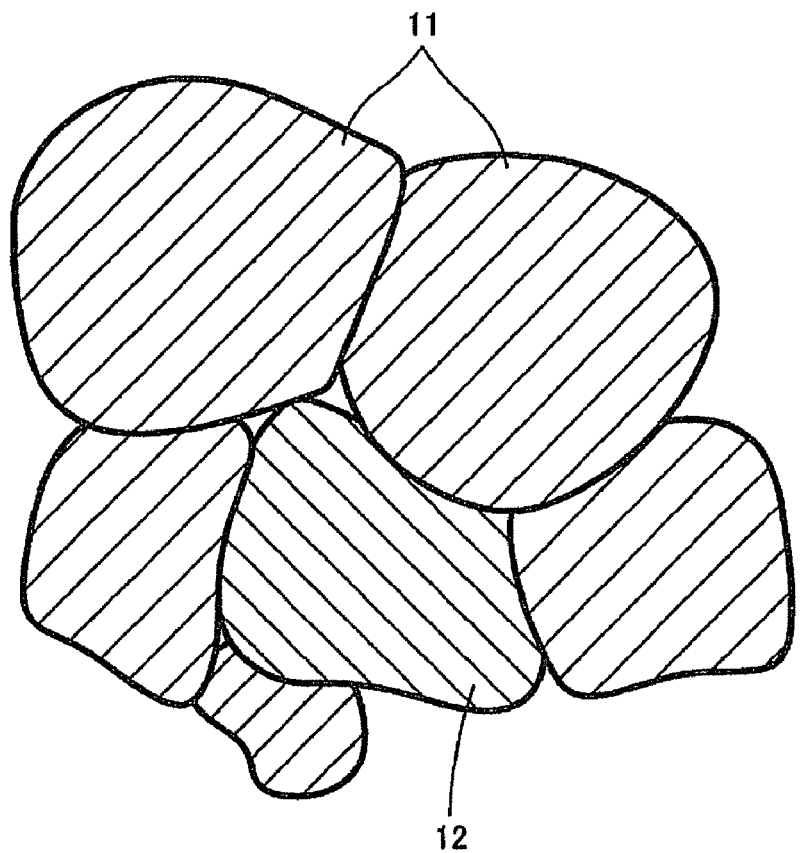
FIG. 2 is a diagram schematically illustrating crystal grains 11 and 12 included in the dielectric ceramic according to the present invention.

FIG. 2 schematically illustrates some crystal grains included in the dielectric ceramic. In the present invention, there are crystal grains 11 in which Si is present in solid solution (hereinafter, referred to as "Si solid solution grains") and crystal grains 12 in which Si is not present in solid solution (hereinafter, referred to as "non-Si solid solution grains") as shown in FIG. 2, and the ratio of the number of the Si solid solution grains 11 is characteristically 5% or more among the crystal grains 11 and 12 included in the dielectric ceramic constituting the dielectric ceramic layers 2.

As described above, when the Si solid solution grains 11 are made present at 5% or more in terms of numbers, the bonding force between the crystal grains 11 and 12 can be improved, and thus, the lifetime characteristics in a moisture resistance loading test can be improved for the laminated ceramic capacitor 1 configured with the use of this dielectric ceramic.

In addition, when the laminate ceramic constituting the dielectric ceramic layers 2 further contains CaO as an accessory constituent, the ratio of the Si solid solution grains 11 is more likely to be increased, and the lifetime characteristics in a high temperature loading test can be improved for the laminated ceramic capacitor 1 configured with the use of this dielectric ceramic.

In the dielectric ceramic according to the present invention, the content of $SiO_2$ as an accessory constituent is preferably 0.1 to 4 parts by mol with respect to 100 parts by mol of the $BaTiO_3$ based main constituent.

In addition, the content of the rare-earth element R as an accessory constituent is preferably 0.1 to 4 parts by mol with respect to 100 parts by mol of the $BaTiO_3$ based main constituent.

In addition, the content of M as an accessory constituent is preferably 0.1 to 4 parts by mol with respect to 100 parts by mol of the $BaTiO_3$ based main constituent.

In the case of the dielectric ceramic containing CaO as an accessory constituent, the content of CaO is preferably 0.1 to 6 parts by mol with respect to 100 parts by mol of the $BaTiO_3$ based main constituent.

For the production of a raw material for the dielectric ceramic, for example, a $BaTiO_3$ based main constituent powder containing a Si component is produced. Therefore, a solid phase synthesis method is applied in which compound powders such as oxides, carbonates, chlorides, and metal organic compounds containing each of constituent elements for the main constituent and Si are mixed at a predetermined ratio, and subjected to calcinations. It is to be noted that a hydrothermal synthesis method, a hydrolysis method, etc. may be applied instead of the solid phase synthesis method mentioned above.

On the other hand, compound powders such as oxides, carbonates, chlorides, and metal organic compounds containing each of the R and M as accessory constituents are prepared. If necessary, a compound powder such as an oxide containing Ca as an accessory constituent is prepared. Then, these accessory constituent powders are mixed with the main constituent powder described above at a predetermined ratio to provide a raw material powder for the dielectric ceramic.

The grain size for the raw material powder is adjusted by, for example, controlling the amount of filled media and/or mixing time used in the mixing step described above. The inventor has found that the grain size for the raw material powder affects the ratio of the number of Si solid solution grains 11 included in the dielectric ceramic sintered in a firing step described later. More specifically, it has been found that the ratio of the number of Si solid solution grains 11 is increased with decrease in the grain size of the raw material powder. In addition, as described above, the CaO contained in the raw material powder makes it easier to increase the ratio of the Si solid solution grains 11.

It is to be noted that in order to increase the ratio of the number of Si solid solution grains 11, methods other than the methods described above may be employed.

In order to produce the laminated ceramic capacitor 1, the raw material powder for the dielectric ceramic, which is obtained as described above, is used to produce a ceramic slurry, ceramic green sheets are formed from this ceramic slurry, the multiple ceramic green sheets are stacked to obtain a raw laminate to serve as the capacitor main body 5, and the step for firing this raw laminate is carried out. In the step of firing the raw laminate, the raw material powder for the dielectric ceramic, which is achieved by the combination as described above, is fired to provide the dielectric ceramic layers 2 composed of the sintered dielectric ceramic.

Experimental examples will be described below which were carried out according to the present invention.

EXPERIMENTAL EXAMPLE 1

(A) Production of Ceramic Raw Material

First, the respective powders of $BaCO_3$, $TiO_2$, and $BaSiO_3$ were prepared as starting materials. These powders were weighed so as to provide a molar ratio of 98:98:2, mixed and ground in a ball mill, and dried. This combined powder was heated at a temperature of 1100° C. for 2 hours to provide a $BaTiO_3$ based powder containing a Si component.

On the other hand, the respective powders of $Dy_2O_3$, MgO, and MnO were prepared as starting materials for accessory constituents, and weighed so that the contents of $Dy_2O_3$, MgO, and MnO were 1.0 part by mol, 1.0 part by mol, and 0.4 parts by mol, respectively, with respect to 100 parts by mol of the $BaTiO_3$.

Next, the $BaTiO_3$ based powder containing the Si component and the respective powders of $Dy_2O_3$, MgO, and MnO were mixed and ground in a ball mill to provide a ceramic raw material powder. In this case, the amount of filled media and/or mixing time were changed to obtain a raw material powder for the dielectric ceramic, which had a grain size shown in the column "Average Grain Size of Raw Material Powder" of Table 1.

(B) Production of Laminated Ceramic Capacitor

To the ceramic raw material, a polyvinyl butyral based binder and ethanol were added, and wet mixing in a ball mill was carried out to produce a ceramic slurry.

Next, this ceramic slurry was formed into the shape of a sheet in accordance with a doctor blade method to obtain a rectangular ceramic green sheet. The ceramic green sheets were formed to have a thickness of 1.0 μm after firing as described later.

Next, a conductive paste containing Ni as its main constituent is applied by screen printing onto the ceramic green sheets to form conductive paste films to serve as internal electrodes.

Next, the multiple ceramic green sheets with the conductive paste films formed were stacked so that the sides to which the conductive paste films were drawn were alternated, thereby providing a raw laminate to serve as a capacitor main body.

Next, the raw laminate was heated to a temperature of 300° C. in an $N_2$ atmosphere to burn the binder, and then fired at a temperature of 1200° C. for 2 hours in a reducing atmosphere composed of a $H_2$—$N_2$—$H_2O$ gas with an oxygen partial pressure of $10^{-10}$ MPa to obtain a sintered capacitor main body.

Next, a Cu paste containing a $B_2O_3$—$Li_2O$—$SiO_2$—$BaO$ based glass frit was applied to both end surfaces of the sintered capacitor main body, and fired at a temperature of 800° C. in an $N_2$ atmosphere to form external electrodes electrically connected to the internal electrodes, thereby providing laminated ceramic capacitors as samples.

The laminated ceramic capacitors thus obtained had outer dimensions of 2.0 mm in length, 1.2 mm in width, and 1.0 mm in thickness, and the dielectric ceramic layers interposed between the internal electrodes had a thickness of 1.0 μm. In addition, the number of the effective dielectric ceramic layers was 100, and the area of the internal electrode opposed per dielectric ceramic layer was 1.4 mm$^2$.

(C) Structural Analysis and Characterization of Ceramic

For the laminated ceramic capacitors obtained, the ceramic structure was observed for analysis on a cross section of the dielectric ceramic layer by TEM-EDX with a probe diameter of 2 nm. The crystal grain in which Si was detected at a depth of 10 nm from the surface layer of each crystal grain was regarded as a "Si solid solution grain", and this measurement was made for 20 grains to obtain the ratio of the number of "Si solid solution grains". The results are shown in the column "Ratio of Number of Si Solid Solution Grains" of Table 1.

In addition, for the laminated ceramic capacitors obtained, the capacitance was measured under the conditions of a temperature of 25° C., 1 kHz, and 0.5 Vrms, and the dielectric constant ∈ and tan δ were obtained from this capacitance. The results are shown in the respective columns "dielectric constant ∈" and "tan δ" of Table 1.

In addition, for the laminated ceramic capacitors obtained, a moisture resistance loading test was carried out. The moisture resistance loading test was carried out under the conditions of a humidity of 85%, a temperature of 85° C., and an applied voltage of 16 V. The sample with its insulation resistance decreased to 200 kΩ or less prior to a lapse of 1000 hours was regarded as defective, and the number of defectives among 100 samples was obtained. The results are shown the column "Number of Defectives in Moisture Resistance Loading Test" of Table 1.

TABLE 1

| Sample Number | Average Grain Size of Raw Material Powder (μm) | Ratio of Number of Si Solid Solution Grains (%) | Dielectric Constant ∈ | tan δ (%) | Number of Defectives in Moisture Resistance Loading Test |
| --- | --- | --- | --- | --- | --- |
| 1 | 0.37 | 0 | 2990 | 2.8 | 25/100 |
| 2 | 0.33 | 0 | 2830 | 2.9 | 14/100 |
| 3 | 0.32 | 5 | 3040 | 3.2 | 0/100 |
| 4 | 0.3 | 10 | 2900 | 3.3 | 0/100 |
| 5 | 0.27 | 10 | 2930 | 3.1 | 0/100 |
| 6 | 0.24 | 20 | 3020 | 3.2 | 0/100 |
| 7 | 0.22 | 25 | 2950 | 2.7 | 0/100 |
| 8 | 0.19 | 30 | 2840 | 2.8 | 0/100 |
| 9 | 0.16 | 45 | 2990 | 2.7 | 0/100 |
| 10 | 0.15 | 60 | 3150 | 2.8 | 0/100 |
| 11 | 0.14 | 50 | 2940 | 2.9 | 0/100 |
| 12 | 0.13 | 100 | 3230 | 2.6 | 0/100 |
| 13 | 0.12 | 80 | 3180 | 2.6 | 0/100 |
| 14 | 0.11 | 100 | 3290 | 3.1 | 0/100 |
| 15 | 0.1 | 100 | 3280 | 3.0 | 0/100 |

It has been determined from Table 1 that the ratio of the number of Si solid solution grains tends to increase with decrease in the grain size for the raw material powder. Furthermore, the number of defectives in the moisture resistance loading test is 0 for the samples 3 to 15 which show 5% or more for the ratio of the number of Si solid solution grains, which show excellent characteristics in moisture resistance loading.

EXPERIMENTAL EXAMPLE 2

In Experimental Example 2, the type and content of each of R and M as accessory constituents were changed.

(A) Production of Ceramic Raw Material

A $BaTiO_3$ based powder containing a Si component was obtained in the same way as in Experimental Example 1, except that the respective powders of $BaCO_3$, $TiO_2$, and $BaSiO_3$ as starting materials were weighed to provide a molar ratio of 99:99:1.

On the other hand, the respective powders of $Ho_2O_3$, $Tb_2O_3$, $Eu_2O_3$, $Er_2O_3$, $Y_2O_3$, $Yb_2O_3$, $Nd_2O_3$, $Gd_2O_3$, and $Dy_2O_3$ were prepared as starting materials for the R component as an accessory constituent, and the respective powders of $WO_3$, MnO, $V_2O_3$, $CO_3O_4$, CuO, NiO, $Al_2O_3$, and $MoO_3$ were prepared as starting materials for the M component as an accessory constituent. Then, these powders were weighed so as to provide molar ratios as shown in Table 2 with respect to 100 parts by mol of the $BaTiO_3$.

Next, the $BaTiO_3$ based powder containing the Si component and the powders for the R component and M component as accessory constituents were mixed and ground in a ball mill to obtain a ceramic raw material powder. In this case, in the same way as in Experimental Example 1, the media diameter and/or mixing time were changed to obtain a raw material powder for the dielectric ceramic, which had a grain size shown in the column "Average Grain Size of Raw Material Powder" of Table 2.

(B) Production of Laminated Ceramic Capacitor

The raw material powder for the dielectric ceramic was used to produce laminated ceramic capacitors for each sample in the same manner as in Experimental Example 1.

(C) Structural Analysis and Characterization of Ceramic

The structural analysis and characterization of the ceramic were carried out in the same manner as in Experimental Example 1. The results are shown in Table 2.

TABLE 2

| | Average Grain Size of Raw Material Powder (μm) | R Component Type | M Component Type | Ratio of Number of Si Solid Solution Grains (%) | Dielectric Constant ε | tan δ (%) | Number of Defectives in Moisture Resistance Loading Test |
|---|---|---|---|---|---|---|---|
| 16 | 0.24 | 0.5Ho | 1.0W | 15 | 2880 | 2.9 | 0/100 |
| 17 | 0.2 | 2.5Tb + 1.5Ho | 0.1Mn | 30 | 2930 | 3.0 | 0/100 |
| 18 | 0.15 | 0.2Gd + 0.1Er | 0.5Mn + 0.1V | 30 | 3030 | 3.2 | 0/100 |
| 19 | 0.14 | 0.1Dy | 0.5Co + 0.5Cu | 25 | 3080 | 3.3 | 0/100 |
| 20 | 0.21 | 0.5Dy + 0.4Y | 0.4V | 25 | 2910 | 3.1 | 0/100 |
| 21 | 0.12 | 1.2Yb | 4.0Ni | 35 | 3210 | 3.2 | 0/100 |
| 22 | 0.12 | 2.2Er | 2.5Ni + 0.1Mn | 60 | 3190 | 2.8 | 0/100 |
| 23 | 0.18 | 1.5Eu | 0.5Co + 0.2W | 20 | 3160 | 2.9 | 0/100 |
| 24 | 0.25 | 1.8Nd | 1.0Al | 35 | 2850 | 2.8 | 0/100 |
| 25 | 0.17 | 2.0Y | 1.0Mo | 55 | 3090 | 2.9 | 0/100 |

As can be seen from Table 2, the ratio of the number of Si solid solution grains was 5% or more for all of the samples in Experimental Example 2. Furthermore, the number of defectives in the moisture resistance loading test is 0 for all of the samples, which show excellent characteristics in moisture resistance loading.

EXPERIMENTAL EXAMPLE 3

In Experimental Example 3, the effect was investigated for the case of further containing CaO as an accessory constituent.

(A) Production of Ceramic Raw Material $BaTiO_3$ based powder containing a Si component was obtained in the same way as in Experimental Example 1, except that the respective powders of $BaCO_3$, $TiO_2$, and $BaSiO_3$ as starting materials were weighed so as to provide a molar ratio of 97:97:3.

On the other hand, a $Dy_2O_3$ powder was prepared as a starting material for the R component as an accessory constituent, a MnO powder was prepared as a starting material for the M component as an accessory constituent, and a CaO powder as an accessory constituent was further prepared. Then, these powders were weighed so as to provide molar ratios as shown in Table 3 with respect to 100 parts by mol of the $BaTiO_3$.

Next, the $BaTiO_3$ based powder containing the Si component, the $Dy_2O_3$ powder and MnO powder, and the CaO powder except for sample 26 were mixed and ground in a ball mill to obtain a ceramic raw material powder. In this case, in the same way as in Experimental Example 1, the media diameter and/or mixing time were changed to obtain a raw material powder for the dielectric ceramic, which had a grain size shown in the column "Average Grain Size of Raw Material Powder" of Table 3.

(B) Production of Laminated Ceramic Capacitor

The raw material powder for the dielectric ceramic was used to produce laminated ceramic capacitors for each sample in the same manner as in Experimental Example 1.

(C) Structural Analysis and Characterization of Ceramic

The structural analysis and characterization of the ceramic were carried out in the same manner as in Experimental Example 1. The results are shown in Table 3.

Furthermore, in Experimental Example 3, a high temperature loading test was carried out. The high temperature loading test was carried out under the conditions of a temperature of 150° C. and an applied voltage of 20 V. The sample with its insulation resistance decreased to 200 kΩ or less prior to a lapse of 1000 hours was regarded as defective, and the number of defectives among 100 samples was obtained. The results are shown the column "Number of Defectives in High Temperature Loading Test" of Table 3.

TABLE 3

| | Average Grain Size of Raw Material Powder (μm) | Accessory constituent Composition | Ratio of Number of Si Solid Solution Grains (%) | Dielectric Constant ε | tan δ (%) | Number of Defectives in Moisture Resistance Loading Test | Number of Defectives in High Temperature Loading Test |
|---|---|---|---|---|---|---|---|
| 26 | 0.18 | 2.0Dy + 0.4Mn | 55 | 4720 | 11.2 | 0/100 | 37/100 |
| 27 | 0.34 | 2.0Dy + 0.4Mn + 1.2Ca | 35 | 3010 | 3.1 | 0/100 | 0/100 |
| 28 | 0.31 | 2.0Dy + 0.4Mn + 0.1Ca | 30 | 2970 | 3.0 | 0/100 | 0/100 |
| 29 | 0.29 | 2.0Dy + 0.4Mn + 0.5Ca | 40 | 2990 | 3.0 | 0/100 | 0/100 |
| 30 | 0.26 | 2.0Dy + 0.4Mn + 1.0Ca | 60 | 2920 | 3.2 | 0/100 | 0/100 |
| 31 | 0.25 | 2.0Dy + 0.4Mn + 2.0Ca | 55 | 2870 | 3.1 | 0/100 | 0/100 |
| 32 | 0.22 | 2.0Dy + 0.4Mn + 6.0Ca | 75 | 3080 | 2.8 | 0/100 | 0/100 |
| 33 | 0.2 | 2.0Dy + 0.4Mn + 4.0Ca | 100 | 2950 | 2.9 | 0/100 | 0/100 |
| 34 | 0.17 | 2.0Dy + 0.4Mn + 1.2Ca | 100 | 3040 | 2.7 | 0/100 | 0/100 |
| 35 | 0.15 | 2.0Dy + 0.4Mn + 1.2Ca | 100 | 3090 | 2.6 | 0/100 | 0/100 |
| 36 | 0.12 | 2.0Dy + 0.4Mn + 1.2Ca | 100 | 3130 | 3.2 | 0/100 | 0/100 |
| 37 | 0.1 | 2.0Dy + 0.4Mn + 1.2Ca | 100 | 3210 | 2.9 | 0/100 | 0/100 |

As can be seen from Table 3, when attention is first drawn to the characteristics in moisture resistance loading, the ratio of the number of Si solid solution grains was 5% or more for all of the samples in Experimental Example 3. Therefore, the number of defectives in the moisture resistance loading test is 0 for all of the samples, which show excellent characteristics in moisture resistance loading.

Next, when attention is drawn to the characteristics in high temperature loading, the samples 27 to 37 provide, because of the CaO contained therein, favorable characteristics in high temperature loading in addition to the characteristics in moisture resistance loading. On the other hand, the sample 26 containing no CaO is inferior in terms of characteristics in high temperature loading.

In addition, as compared with the case of Experimental Example 1, it is determined that the ratio of the number of Si solid solution grains is more likely to be increased even when the raw material powder has a relatively large average grain size.

In addition, the sample 26 containing no CaO is high in tan δ, from which it is estimated grain growth occurred, whereas the samples 27 to 37 containing CaO is low in tan δ, from which it is determined that CaO also has the function of decreasing the likelihood of grain growth.

While the main constituent of the dielectric ceramic is $BaTiO_3$ in the experimental examples, it has been confirmed that substantially the same results are achieved even in the case of a composition in which Ba is partially substituted with at least one of Ca and Sr, or in the case of a composition in which Ti is partially substituted with at least one of Zr and Hf.

What is claimed is:

1. A dielectric ceramic comprising:
   a $BaTiO_3$ based material as a main constituent, and R, M, and $SiO_2$ as accessory constituents,
   wherein R is at least one rare-earth element selected from Nd, Eu, Gd, Tb, Dy, Ho, Er, Yb, and Y,
   wherein M is at least one element selected from Mg, Mn, Ni, Co, Cu, Al, Mo, W, and V, and
   wherein among crystal grains included in the dielectric ceramic, a ratio of a number of Si solid solution crystal grains is 5% or more.

2. The dielectric ceramic according to claim 1, wherein the $BaTiO_3$ based main constituent has Ba partially substituted with at least one of Ca and Sr, and Ti partially substituted with at least one of Zr and Hf.

3. The dielectric ceramic according to claim 1, wherein a content of the $SiO_2$ as an accessory constituent is 0.1 to 4 parts by mol with respect to 100 parts by mol of the $BaTiO_3$ based main constituent.

4. The dielectric ceramic according to claim 1, wherein a content of the rare-earth element R as an accessory constituent is 0.1 to 4 parts by mol with respect to 100 parts by mol of the $BaTiO_3$ based main constituent.

5. The dielectric ceramic according to claim 1, wherein a content of M as an accessory constituent is 0.1 to 4 parts by mol with respect to 100 parts by mol of the $BaTiO_3$ based main constituent.

6. The dielectric ceramic according to claim 1, further comprising CaO.

7. The dielectric ceramic according to claim 6, wherein a content of CaO is preferably 0.1 to 6 parts by mol with respect to 100 parts by mol of the $BaTiO_3$ based main constituent.

8. A laminated ceramic capacitor comprising:
   a capacitor main body containing a plurality of stacked dielectric ceramic layers, and a plurality of internal electrodes formed along specific interfaces between the dielectric ceramic layers; and
   a plurality of external electrodes formed in different positions from each other on an outer surface of the capacitor main body and electrically connected to specific ones of the internal electrodes,
   wherein the dielectric ceramic layers comprise the dielectric ceramic according to claim 1.

9. The laminated ceramic capacitor according to claim 8, wherein the dielectric ceramic layers have a thickness of approximately 1.0 μm.

10. The laminated ceramic capacitor according to claim 8, wherein the $BaTiO_3$ based main constituent has Ba partially substituted with at least one of Ca and Sr, and Ti partially substituted with at least one of Zr and Hf.

11. The laminated ceramic capacitor according to claim 8, wherein a content of the $SiO_2$ as an accessory constituent is 0.1 to 4 parts by mol with respect to 100 parts by mol of the $BaTiO_3$ based main constituent.

12. The laminated ceramic capacitor according to claim 8, wherein a content of the rare-earth element R as an accessory constituent is 0.1 to 4 parts by mol with respect to 100 parts by mol of the $BaTiO_3$ based main constituent.

13. The laminated ceramic capacitor according to claim 8, wherein a content of M as an accessory constituent is 0.1 to 4 parts by mol with respect to 100 parts by mol of the $BaTiO_3$ based main constituent.

14. The laminated ceramic capacitor according to claim 8, further comprising CaO.

15. The laminated ceramic capacitor according to claim 14, wherein a content of CaO is preferably 0.1 to 6 parts by mol with respect to 100 parts by mol of the $BaTiO_3$ based main constituent.

* * * * *